United States Patent [19]

Devienne

[11] 4,014,975
[45] Mar. 29, 1977

[54] METHOD FOR SEPARATING THE ISOTOPES OF A CHEMICAL ELEMENT

[76] Inventor: Fernand Marcel Devienne, 117 La Croisette, 06400 Cannes, France

[22] Filed: Apr. 29, 1975

[21] Appl. No.: 572,632

Related U.S. Application Data

[63] Continuation-in-part of Ser. No. 549,843, Feb. 13, 1975, abandoned.

[30] Foreign Application Priority Data

Feb. 21, 1974   France .............................. 74.05943

[52] U.S. Cl. ........................................ 423/19; 55/2; 204/164; 250/427
[51] Int. Cl.² .................. C01G 43/00; B01D 59/50
[58] Field of Search ............. 423/19; 250/423, 427; 55/2, 111; 204/164

[56]   References Cited

UNITED STATES PATENTS

| | | | |
|---|---|---|---|
| 3,522,425 | 8/1970 | Rich | 55/2 X |
| 3,699,333 | 10/1972 | Cohen et al. | 250/423 X |
| 3,740,552 | 6/1973 | Pressman | 55/2 X |
| 3,772,519 | 11/1973 | Levy et al. | 250/423 X |

*Primary Examiner*—Edward A. Miller
*Attorney, Agent, or Firm*—Cameron, Kerkam, Sutton, Stowell & Stowell

[57]   ABSTRACT

A beam of positive or negative primary ions of at least one compound of a chemical element is accelerated in order to pass through collision boxes placed in series. As a result of inelastic collisions of the ions with the molecules of a neutral target gas within each collision box, a given percentage of primary ions is dissociated into at least two fragments, one of which is a secondary ion in the form of at least two isotopic species. The collision boxes are brought to a potential $V_2$ so as to trap preferentially one isotopic species which is condensed within each box.

15 Claims, 4 Drawing Figures

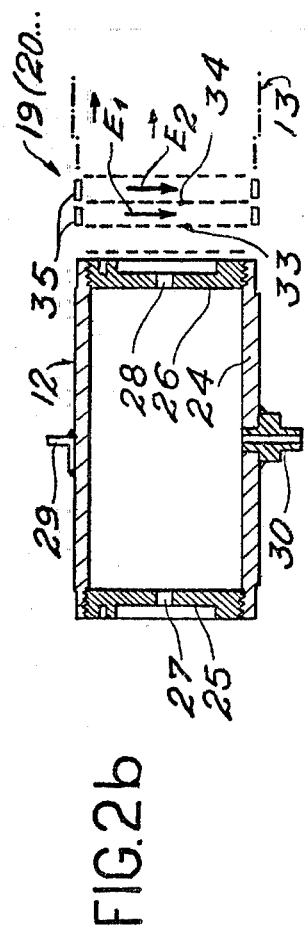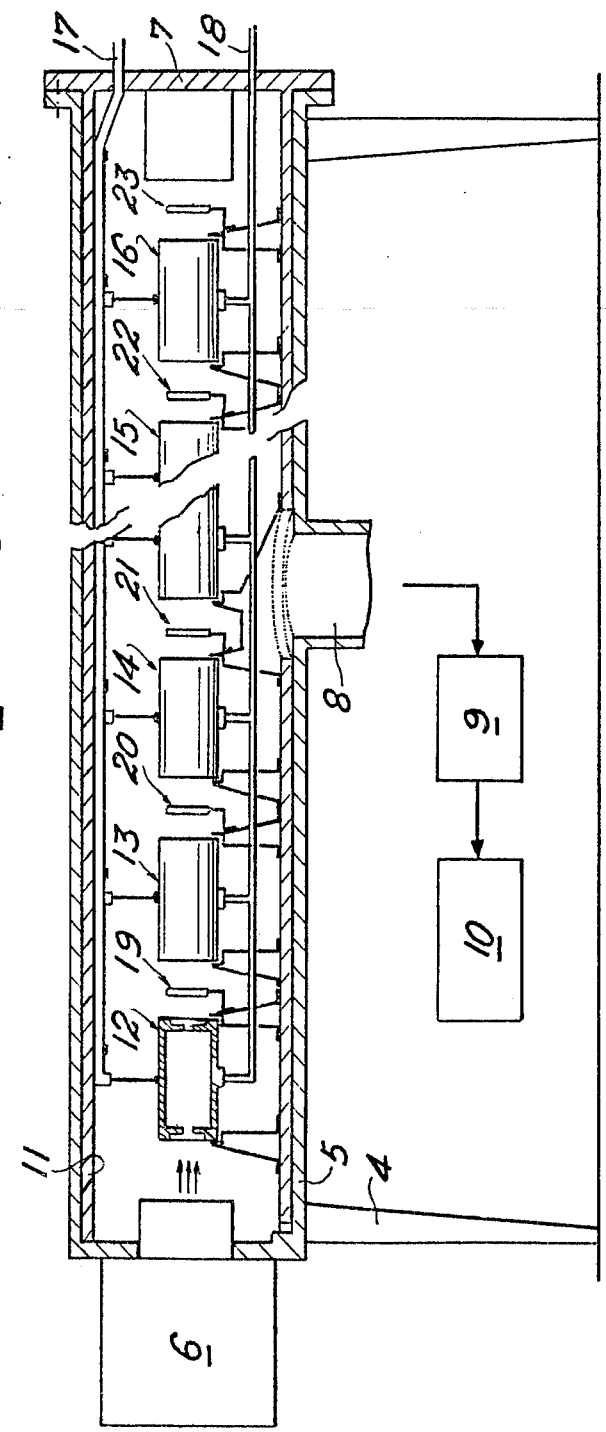

METHOD FOR SEPARATING THE ISOTOPES OF A CHEMICAL ELEMENT

CROSS-REFERENCE TO RELATED APPLICATION

This application is a continuation-in-part of application Ser. No. 549,843, filed Feb. 13, 1975, now abandoned.

This invention relates to techniques for the separation of chemical compounds having molecular masses which are very close in value and especially isotopic species of the different elements. The invention applies primarily although not in any limiting sense to the separation of uranium isotopes of mass 235 and 238.

A number of methods which can be employed for separating the isotopes of chemical elements are known at the present time and these mainly include mass spectrometry and methods which are derived from this latter, namely the so-called gaseous diffusion methods, the methods of separation by electrolysis or by dual-temperature exchange as well as the techniques of separation by ultracentrifugation. A certain number of disadvantages are attached to all these methods which have been employed at different times and for various reasons. They give rise in any case to high capital expenditure and also to practical difficulties whenever steps are taken to carry out large-scale production of chemical elements which are strongly enriched in one of the isotopes constituting the original natural element.

In the very important case of separation of the uranium isotopes, enrichment by gaseous diffusion is the only technique in actual use on an industrial scale today. Specialists in this field are well aware of the fact that, although it produces remarkable results, this technique is very difficult to apply in practice from a technological standpoint and is fairly costly from an economic standpoint by reason of the very large number of microporous barriers through which uranium hexafluoride $UF_6$ has to pass in order to permit significant preferential diffusion of the isotope 235 with respect to the isotope 238. Furthermore, all the difficulties inherent in the actual nature of the only gaseous compound which can be employed for this purpose, namely hexafluoride $UF_6$, are well-known: this compound is in fact highly corrosive, highly toxic and is in the gaseous state only above approximately 65° C.

The present invention relates to a method in which the isotopes of a chemical element are separated by successive filtrations of a beam of positive or negative ions, which is much more straightforward than the techniques of separation by gaseous diffusion and which provides at least equal efficiency from an economic point of view.

This method of separation essentially consists in producing a beam of positive or negative primary ions of at least one compound of said element, in accelerating said ion beam in order to pass said beam through a predetermined number of collision boxes which are open at both ends and placed one after another in series, in successively initiating within each collision box, by inelastic collisions of said ions with the molecules of a neutral target gas with which said boxes are filled at low pressure, the dissociation of a given percentage of the primary ions into at least two fragments such that one fragment is a secondary ion which appears in the form of at least two different isotopic species with respect to the element to be separated, and in choosing the potential $V_2$ to which said collision boxes are brought in order to trap preferentially therein one of the above-mentioned isotopic species which is caused to condense within each collision box.

In an embodiment of the presen process, means are placed between two consecutive boxes for the collection of secondary ions of each isotopic variety, each variety being thus condensed in a separate associated device. More precisely, such an associated device provides a transverse electric field which deflects the low energy ions so they can be laterally extracted with respect to the beam.

The method according to the present invention is essentially based on the following physical process. If a neutral target gas under low pressure contained in a collision box is bombarded with a beam of primary ions of a compound of the element whose isotopes are to be separated, a given percentage of these primary ions is dissociated by inelastic collisions with the molecules of the neutral target gas and the secondary ions thus formed carry away with them in practice a kinetic energy which is proportional to their mass. In consequence, if the electric charge of the secondary fragments thus formed is known, it is possible to select a sufficiently high potential $V_2$ of opposite sign to this charge and at absolute value to ensure that said secondary ions do not have the necessary kinetic energy to pass across the potential barrier corresponding to the exit of the box in which they have been formed, with the result that they are trapped inside this latter. It is thus apparent that, if some of the dissociation fragments carry the same electric charge and appear in the form of several isotopic species, the value of the voltage $V_2$ to which the collision box is brought can be chosen so that the fragments corresponding to one of the isotopic species (namely the heaviest) pass to the exterior whilst the fragments corresponding to another species (namely the lightest) are on the contrary retained inside the box. Provision needs only be made in this case for a set of collision boxes placed behind each other in series and all brought to the same potential $V_2$ in order to obtain from a beam of primary ions of given energy a decomposition followed by a trapping in series within each box of a certain number of secondary ions which are thus separated as a function of their respective mass, that is to say of their isotopic species in the case under consideration. The method according to the invention is of very general application and scope: the primary ions employed may with equal ease be either positive or negative and it is possible to collect at will either the heavy isotope or the light isotope as the case may be. In fact, if it is desired to collect the lighter compound, this latter is readily obtained by simple condensation within the boxes in which it is trapped; on the contrary, if the heavy component is to be collected, this component, is found again in the beam at the exit of each box, at which it can be extracted simply by electrostatic deflection. Moreover, it is to be understood that the process which is essentially described in this specification, as being applied to isotopic separation, can be used in a manner which is evident to anyone versed in the art for the chemical separation of ionized molecules having masses which are different and especially very close in value. The neutral target gas employed can be as desired; rare gases such as argon and helium for example are wholly suitable.

In accordance with an important feature of the present invention, the voltage $V_2$ is chosen on the basis of information previously recorded experimentally in regard to the location and area of the different energy peaks corresponding to each of the secondary ions formed in the boxes while taking into account the fact that the chemical nature and the proportion of secondary ions trapped within each box are defined by the presence of the area of said peaks or portions of peaks located within the range of voltages which are lower at absolute value than the value chosen for the voltage $V_2$.

An essential difference between the method according to the present invention and the techniques of separation by gaseous diffusion is immediately apparent. In the techniques just mentioned, the enrichment is in fact progressive and take place very slowly from stage to stage through hundreds of thousands of barriers placed in series; on the contrary, in the case of the present invention, the physical separation phenomenon is reproduced qualitatively and indentically within each of the boxes which constitute a given set. To this end, all the boxes are brought to the same potential $V_2$ and the ions which have not been dissociated within a box of the order of $p$ pass out of this box and penetrate into the following box of the order $p+1$. A final enrichment factor corresponding exactly to the selected value is achieved simultaneously within each collision box and in a single step. It then only remains necessary to condense on the walls of each box the material corresponding to the separated secondary ions trapped therein in order to obtain directly either the chemical compound which is enriched in one of its constituent elements or a mixture which contains said compound.

An elementary calculation makes is possible to determine the efficiency of decomposition of the incident beam of primary ions and by this very means to form an estimate of the efficiency of the process. In fact, if the initial ions conform to one decomposition diagram alone and if the percentage ratio of this decomposition is equal to $r\%$ of the beam which enters each box, the initial ion beam emerges from the $n$th box with an intensity ratio equal to $(1 - r)^n$ with respect to the beam which enters the first box. (Strictly speaking, this calculation presupposes that one neglects the effects of dispersion of the beam arising from the space charge as well as the inevitable exchange of charges between the ions of the beam and the molecules of the neutral target gas but it is confirmed by experience that this approximation is justified in order to obtain correct orders of magnitude).

For example, if $r=0.05$, if $n=20$, the beam emerging from the $n$th box represents 35.85% of the initial beam, the decomposition within the boxes is 64.15%. If it is assumed that $n=40$, the emergent beam represents in that case only 12.85% and the decomposition is 87.15%.

By virtue of the simplicity of the system, it is possible by way of example to adopt a mean distance of 8 to 10 cm between the centers of the boxes and to have an apparatus having a diameter of 20 to 25 cm and a length of the order of 2 m, with 20 boxes each fitted with an interchangeable liner tube in order to permit ready collection of the ions which have been trapped and condensed on its internal wall. If the dissociation efficiency is higher than 5%, the number of boxes can be reduced. On the other hand, if the efficiency is only 2 to 3%, this FIGURE can be increased.

In accordance with a secondary feature of the method which forms the subject of the invention, the secondary ions which are not trapped in a collision box pass out of this latter with a very low kinetic energy which is close to zero since their mass is by definition very close to that of the isotope which it has been endeavored to trap. They can therefore very readily be extracted from the primary ion beam which continues to travel within the following collision box, as a result of simple electrostatic deflation by means of a weak field which has practically no action on the primary ion beam itself.

In the more general case, however, in which there are a number of diagrams of dissociation of primary ions into secondary ions, the formula given above is no longer valid since the phenomena are more complex and it is very easy to understand intuitively that the final efficiency of the desired isotopic separation is consequently reduced.

It is also recommended to choose a pressure of neutral gas within each collision box so as to ensure that, on the one hand, the dissociation phenomena are distributed within each of the collision boxes constituting a group and that, on the other hand, the processes of charge transfer between the incident beam of primary ions and the neutral gas molecules are not of excessive magnitude. In any case, this phenomenon can never be completely avoided but is not usually troublesome since it represents only a small fraction of the incident ions; these latter are thus converted to neutral molecules and continue to travel through all the boxes in series of a given group while being naturally lost so far as the isotopic separation and dissociation reaction is concerned.

In even more precise terms, the invention is directed to a method for the separation of isotopes of chemical elements in which the primary incident ions of charge $e$ of mass $M$ enter each collison box with the energy $eV_1$ and there is retained in each box at least part of the formed secondary ions of mass $m$ and of charge $e$ corresponding to the isotopic species to be separated by bringing each collision box to a potential $V_2$ of opposite sign to that of the charge $e$ of the absolute value at least equal to $mV_1/(M - m)$ subject to deviations arising from the distribution of the ion dissociation energies about said value.

In point of fact, the application of the method according to the invention in the most frequent case is based on the use of a beam of primary ions which all have the same charge (unitary and positive in the majority of cases) and also the same energy, this condition being practically essential if it is desired to have results which can be exploited on an industrial scale.

If consideration is in fact given to a primary ion of mass $M$ and of charge $e$ having a kinetic energy $eV_1$ corresponding to its extraction potential $V_1$, its kinetic energy becomes $e(V_1 - V_2)$ when it enters a collision box which has been brought to the potential $V_2$. If consideration is given to a secondary ion of mass $m$ which carries the same charge $e$ formed from the previous ion $M$, it can be accepted in a first approximation that said secondary ion carries with it a kinetic energy equal to $(m/M)e(V_1-V_2)$ and this point of view is fully confirmed by experience. In order to satisfy the condition in which a secondary ion of mass $m$ cannot pass out of the collision box in which it has been produced, the value of kinetic energy of said ion which has just been given must be lower than the extractive work of the electrical forces of the exit of the box, at which it has to pass through a potential barrier equal to $-V_2$.

The condition of trapping of a secondary ion of mass $m$ of this type is therefore written:

$$(m/M)e(V_1-V_2) < -eV_2$$

that is to say:

$$-V_2 > (mV_1/M - m)$$

In theory, the overall result is therefore exactly the same as if, in the case of a secondary ion having a given mass $m$ and corresponding therefore to a predetermined isotope of the chemical element to be separated, there existed a critical value of the potential $V_2$ to which the different collision boxes are brought and above which all the secondary ions corresponding to the same mass are retained in the corresponding boxes. In the particular but very frequent case in which the separation which is desired to carry out concerns a separation between two isotopes of the same chemical element, it should theoretically be possible to separate them by choosing for the potential $V_2$ of the different collision boxes a value between the critical values corresponding to each isotopic species of the compound constituting the secondary ion of mass $m$. This does not apply in practice and things are not so simple because in point of fact, by reason of the distribution of the different energies of dissociation which are possible in the case of a given primary ion of mass $M$ about its mean theoretical value, the phenomena mentioned above are governed not by potential lines but by energy peaks of decomposition having a certain width and in which the respective areas in any case correspond approximately to the mass percentage of the different isotopes of the element considered. It can therefore by understood that a large number of possible cases of figures can arise:

a. in the theoretical case in which the secondary ion of mass $m$ has only two isotopic species in which the corresponding energy peaks of decomposition are completely separate from each other, we revert to the previous case in which the separation can be strictly and wholly obtained by choosing a voltage $V_2$ which is comprised between the two peaks;

b. if, as is most usually the case, the energy peaks corresponding to two adjacent isotopes overlap to a partial extent or if, as is frequently the case, the diagram of decomposition into secondary ions results in a mixture of a number of isotopic fragments having different masses in which the peaks can even be placed astride of each other, the most favorable value of the voltage $V_2$ must be determined empirically, precisely as a function of the total enrichment which it is desired to obtain.

In some cases, this situation of partial overlap of the energy peaks can be an advantage since, by choosing precisely the value of the voltage $V_2$ of the collision boxes, it is sometimes possible to obtain a priori a composition of the material retained in said boxes in a predetermined enrichment factor immediately and in a single step.

In order to apply the method according to the invention in the case in which there is only one type of secondary ions containing the element to be separated in two isotopic species having masses $m_1$ and $m_2$, it is convenient in practice to determine empirically between the two values $$(-m_1 V_1/M_1 - m_1)$$

and $$(-m_2 V_2/M_2 - m_2)$$

the value of $V_2$ which provides the desired enrichment in one of the isotopes, $M_1$ and $M_2$ being adjacent molecular masses of two isotopic variations of the primary of mass $M$.

The desired enrichment can also be achieved if necessary in several steps at increasingly high factors in order to obtain a given final enrichment factor and to ensure that this enrichment is not accompanied by a substantial loss of the desired isotope, which could have been the case if it had been intended to obtain the same enrichment factor in a single step. By way of example, this makes it possible to employ primary ions which are themselves constituted by double isotopic mixtures (for example $URr_4$, $UBr_3I$, $UCl_3I$, $UCl_4$, and so forth) in which the energy peaks obtained are numerous and interlaced.

It can sometimes be an advantage to form the primary ion beam by means of a number of compounds of the element to be enriched instead of a single compound. In all cases of application of the method, it is clearly a precise study of the diagrams of decomposition in secondary ions and of the corresponding energy peaks which enables the experimenter to determine the advantage of a method of this type and the voltage $V_2$ which he must choose in order to obtain a predetermined enrichment factor.

Finally, in an advantageous alternative form of the method, it can be useful to bring some boxes of a given group to slightly different potentials in order to effect simultaneous collection of mixtures at different enrichments factors determined experimentally by means of a previous study of the voltage peaks.

The method in accordance with the present invention offers a large number of specific advantages over the techniques of gaseous diffusion employed up to the present time. Among these advantages can be mentioned in particular:

The practical application of the invention is particularly simple since it essentially entails the use of a series of metallic collision boxes which are all brought to the same electric potential and may be cooled to a predetermined temperature if necessary. These boxes are supplied with a neutral target gas as low pressure and are placed within a chamber in which a secondary vacuum is maintained. No new technological problem needs therefore be solved in order to put a device of this type into operation. Furthermore, a separation plant which makes use of the method can be put into operation progressively and this makes it possible to distribute capital investments in time. In fact, each collision box produces a quantity of enriched material in a single step with a predetermined enrichment factor as desired and any increase in number of the collision boxes has the effect only of increasing the quantity of enriched material produced. This method makes it possible to obtain uranium or a uranium compound at a given enrichment between 1 and 70%, for example, in a single operation; the cost price of the enrichment is subtantially proportional to the enrichment factor. Should it be decided to change over from a factor of 1% to a factor of 70%, no modification need be made in the apparatus. Starting from uranium enriched to a few per cent, it is possible to obtain uranium enriched to 99%. It is also possible to employ separation wastes and to obtain uranium enriched to 3%, for example.

Fault conditions which are liable to affect either certain individual collision boxes or a group of boxes in series in an isotope separation unit do not have any influence on the remainder of the installation. Each collision box in fact operates independently of adjacent boxes and, in an installation comprising a number of groups, each group is self-contained and is not dependent in any way on adjacent groups. This is also an outstanding advantage over the method of progressive enrichment in series.

In some particularly favorable instances, total separation can be obtained in a single step, the isotope which is not retained in the boxes simply recovered if so desired at the end of the beam path.

It is possible to choose in each particular case the compounds used for producing the primary ion beam and consequently to operate with compounds which are more pleasant to handle than uranium hexafluoride with all its attendant disadvantages which have already been noted.

It is not necessary to employ which already have a high degree of purity since it is an objective of the method according to the invention to sort components as a function of their different masses and since the impurities modify the the efficiency only in proportion to their own concentration.

The installations can be constructed in simple metal hangars and do not require a very large area for the site location. No special precaution need be taken in regard to the environment and, depending on the chemical nature of the compounds employed, pollution hazards are usually infinitely lower than in the case of handling of uranium hexafluoride.

A clearer understanding of the invention will in any case be obtained from the following description of different examples of application of the method for separating the isotopes of a chemical element and of the $d$ device for carrying out said method. These different examples will be described with reference to the accompanying figures, in which:

FIG. 2 shows in sectional elevation a partial view of an isotope separation apparatus in accordance with the invention, wherein FIG. 2a shows the main body of this apparatus and FIG. 2b shows the constructional detail of one of these collision boxes;

Figure 1:
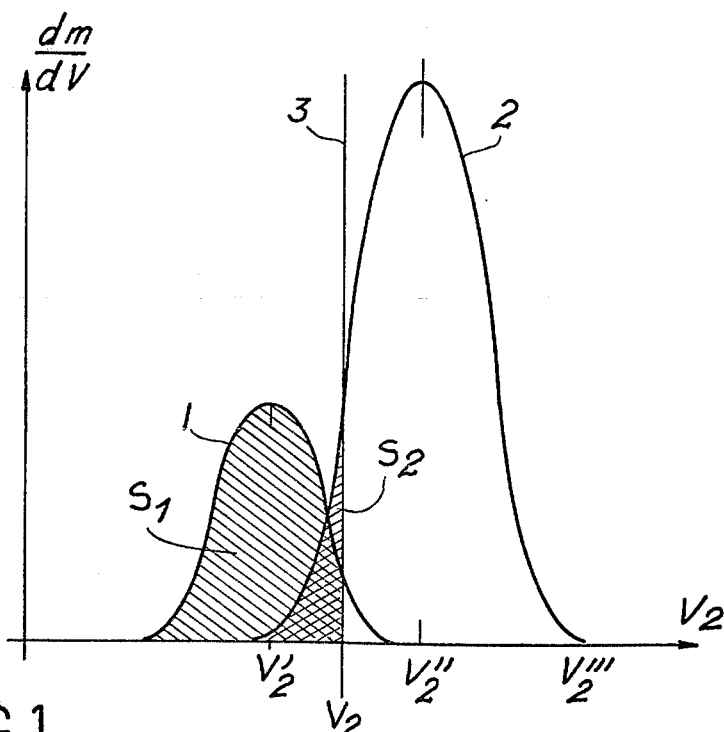
FIG. 1 shows the energy peaks representing the variation of mass $dm/dV$ trapped within each collision box, as a function of the potential $V_2$ to which each box is brought.

FIG. 1 serves to provide a practical illustration of the comments previously made in regard to the choice in a particular case of the voltage $V_2$ to which each collision box is brought as a function of the isotope separation factor which it is desired to attain. In the particular example of FIG. 1, consideration has been given to the case in which two compounds of closely related isotopic composition correspond respectively to the energy peaks of decomposition 1 and 2 centered respectively on the voltages $V'_2$ and $V''_2$ and in which these two voltage peaks partly overlap. This is the case for example with the separation of the uranium tri-iodide ions having the respective formulae $^{235}UI_3$ and $^{238}UI_3$. In FIG. 1, the area of the peak $S_1$ with respect to the area of the peak $S_2$ has been purposely exaggerated for the sake of enhanced clarity of the drawing but these two areas are in fact in the same ratio as the natural isotope components. When this ratio is of very small value, it can even happen in some instances that the peak of one of the compounds is not clearly discernible since it is reduced in such a case to a simple and more or less apparent irregularity of the curve of separation of the isotope which is present in the largest proportion.

The value $V_2$ of the voltage which is really chosen for the supply of the collision boxes is materialized in the drawing by the vertical half-line 3 which delimits with the peaks 1 and 2 respectively the surface area $S_1$ in the case of peak 1 and the surface area $S_2$ in the case of peak 2. The isotopic proportion of the compounds in the mixture retained in the different collision boxes is equal to the ratio of the two areas $S_1$ and $S_2$ corresponding to each of the two isotopes to be separated. It can therefore be readily seen that, depending on the position chosen for the straight line 3, that is to say finally according to the value of $V_2$, it is possible to obtain either the first isotope in the pure state or a mixture of these two isotopes in predetermined proportions. It is also evident that there is no advantage whatever to be gained by giving $V_2$ a value which is higher than $V'''_2$ above which both isotopes would then be trapped within the boxes, that is to say above which the original isotopic composition would finally be found once again.

Anyone versed in the art can readily generalize the reasoning drawn from this FIG. 1 to the case in which the energy peaks of the different masses are more than two in number and may even relate to a plurality of chemical compounds of one and the same element which is present in the form of several isotopic species. It needs only be considered in fact that the total masses retained in each box have a chemical nature and a proportion in the overall mixture which are represented by the presence of the different decomposition peaks and the sum of the areas of the different peaks located on the left-hand side of the straight line 3 in FIG. 1. In each particular case, anyone versed in the art who has studied the decomposition diagrams and drawn up the chart of the separation peaks will be able to choose the abscissa $V_2$ of the straight line 3, that it to say the potential of the collision boxes as a function of the desired result.

Referring now to FIG. 2, there will be described in greater detail an apparatus in accordance with the invention for carrying out the method. This apparatus essentially comprises a frame 4 on which is mounted a tubular chamber 5 hermetically closed at one end on an ion source 6 and at the other end by a detachable cover 7. This tubular chamber 5 is provided with a lateral opening 8 of large size for putting said chamber into communication with a secondary-vacuum pumping system comprising a first primary-vacuum pump 9 completed by a second secondary-vacuum pump 10. The combined assembly of the two pumps 9 and 10 as shown diagrammatically serves to maintain a vacuum a of the order of $10^{-5}$ torr within the tubular chamber 5.

In accordance with the invention, there is removably and slidably mounted within said tubular chamber 5 a cylindrical liner tube 11 on which are fixed in axial alignment the different collision boxes such as 12, 13, 14, 15 and 16. These different collision boxes are of metal and brought to the same potential $V_2$ by means of the electric conductor 17 which supplies them in parallel; furthermore, these collision boxes 12 to 16 are also supplied in parallel via the pipe 18 with a neutral gas such as argon or helium for example, at a low pressure of the order of $10^{-3}$ torr. Finally, provision is made between each of the boxes 12 to 16 for an electrostatic deflector, five of which are shown in this example and designated respectively by the reference numerals 19, 20, 21, 22 and 23. As explained earlier, these deflectors are intended to cause the isotope compounds of mass $m$ which have not been trapped within the collision boxes to be deflected towards the walls of the cylindrical liner tube 11 on which they are condensed. To this end and as already explained in the foregoing, a very low voltage is sufficient since, by definition, these secondary ions are discharged with a kinetic energy which is either close to zero or very weak and it is therefore possible to separate them from the primary ion beam without thereby resulting in any appreciable disturbance of this latter.

In certain cases, it may be of interest to improve the condensation of the selected secondary ions which, by reason of insufficient decceleration tend to leave the collision boxes. To this end, in accordance with the present invention, there can be provided between two consecutive boxes collection means for secondary ions. By way of illustration, these means consist of a series of grills in number equal to the number of isotopic varieties to be separated, brought to slightly positive potentials, if the ions are positive, and increasing in the direction of movement providing close control of the decceleration of the ions to be trapped. Each variety of secondary ions can then be trapped in an associated separate device creating primarily a local transverse electric field to extract the low energy ions laterally with respect to the beam.

FIG. 2b shows on a larger scale the constructional detail of a collision box such as the box 12 provided with a body 24 and with two screwed-in covers 25 and 26 each having a central aperture 27 and 28 for the passage of the beam; the cylindrical body 24 is also provided with a terminal lug 29 for bringing the unit to the desired potential $V_2$ and with a nozzle 30 which is connected to the pipe 18 and thus serves to maintain a low pressure of neutral gas within the box 12. This neutral gas therefore escapes continuously through the apertures such as 27 and 28 of each collision box towards the interior of the tubular chamber 5 from which it is continuously extracted by the pumps 9 and 10.

In FIG. 2b, there is schematically shown at the output of box 12, apparatus useful in certain particular cases to improve the condensation of the secondary ions when these by reason of insufficient decceleration, would tend to leave the box. To this end, deflector 19 has two grills 33 and 34 brought to retarding potentials and between which is created by known means, such as plate 35, transverse electric fields $\vec{E}_1$ and $\vec{E}_2$ providing lateral extraction of the low energy secondary ions. These fields of low intensity are particularly without effect on the non-decomposed primary ions.

When this proves necessary, it is also possible to cool the walls of each of the chambers 12 to 16 in order to cause the condensation of the gaseous material corresponding to the secondary ions formed and retained within each collision box. A circulation system of this type can readily be constructed and has not been illustrated for the sake of enhanced simplification of the drawing of FIG. 2.

In order to give a clear ideal in regard to the possible orders of magnitude of an installation in accordance with the description of FIG. 2, there is commonly employed a group of 10 collision boxes each having a diameter of 3 cm and a length of 6 to 12 cm. A space of 2 cm is maintained between two consecutive boxes and the cylindrical liner tube 11 has a diameter of 15 cm.

When the apparatus has operated for a sufficient period of time to produce by condensation within each collision box the requisite masses of either pure or enriched isotopic compound, it is only necessary to withdraw the removable cylindrical liner tube 11 from the tubular chamber 5 in simple translational motion, whereupon the material obtained can be collected directly from the internal walls of each collision box. It should be noted that this apparatus also makes it possible to recover the portion of the mass corresponding to the secondary ions which have not been trapped within the boxes and which has become attached to the cold internal walls of the removable liner tube 11 during the performance of the process.

Figure 3:
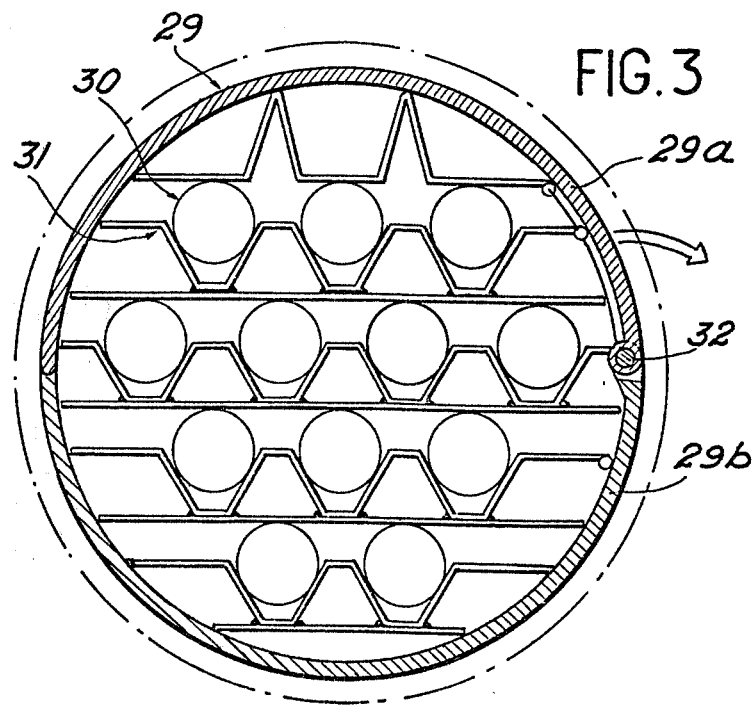
FIG. 3 is an axial sectional view of an installation comprising twelve groups of collision boxes in parallel within a common vacuum chamber.

FIG. 3 shows, within a cylindrical chamber 29 formed by two half-shells 29a and 29b, a series of twelve separation units such as 30 which are held in position by means of metallic spacer members 31. This arrangment makes it possible to optimize the overall size of an apparatus comprising a plurality of separation units in the smallest possible volume. In order to carry out discharging operations, the two half-shells 29a and 29b open by rotation about the pivot-pin 32.

By way of example, the apparatus described above can be employed for separating the uranium isotopes from uranium tetraiodide having the formula $UI_4$ by adopting the two following decomposition diagrams which are observed simultaneously in the most frequent case:

$$UI_4^+ \rightarrow UI_3^+ + I$$

and $$UI_4^+ \rightarrow UI_2^+ + I_2$$

with respective yields of 8.3% and 1.2% of $UI_3$ and $UI_2$ secondary ions formed with respect to the $UI_4$ primary ions.

Under these conditions, a source of $UI_4^+$ primary ions is employed for the purpose of producing the beam which is propagated through the different collision boxes which are filled with an inert gas such as argon or helium. The $UI_3^+$ secondary ion then appears in two different species, namely $^{235}UI_3^+$ and $^{238}UI_3^+$ which correspond respectively to decomposition ratios $m/M$ having values $$x_1 = (m_1/M_1) = (^{235}UI_3/^{235}UI_4) = (616/743) = 0.8291$$

and $$x_2 = (m_2/M_2) = (^{238}UI_3/^{238}UI_4) = (619/746) = 0.8298$$

In order to carry out the separation of these two ions by preferential trapping of the $^{235}UI_3^+$ ion in the different collision boxes, it is only necessary to apply to each box a voltage comprised between the two calculated values $V'_2$ and $V''_2$ which are given by the following formulae:
$$V'_2 = -x_1 V_1/(1-x_1)$$

$$V''_2 = -x_2 V_1/(1-x_2)$$

that is to say in fact a voltage comprised between $-4.8503\ V_1$ and $-4.8740\ V_1$; the first of these two voltages corresponds to the summit of the peak of the compound $^{235}UI_3$ and the second voltage corresponds to the summit of the peak of the compound $^{238}UI_3$.

If the decomposition and the parasitic phenomena are not of excessive magnitude, the energy peaks are completely separated although superposition of the two peaks may occur in the majority of cases as a result of the decomposition energy. Depending on the desired degree of enrichment, a voltage comprised between the two values $V'_2$ and $V''_2$ is adopted for the box $B_2$.

If $V_1 = 2000$ volts is adopted, the voltage $V_2$ is therefore caused to vary between $-9700$ volts and $-9748$ volts. When the conditions of decomposition are known, the voltage $V_2$ can of course be determined empirically in order to produce a given value of enrichment.

If ten collision boxes are employed in series, the total decomposition of the beam is $1 - (1-r)^{10} = 1 - [1 - (0.083 + 0.012)]^{10} = 1 - (0.905)^{10} = 1 - 0.369 = 0.631$.

In actual fact and under ordinary experimental conditions, there is found a not-negligible proportion of $UI_3^+$, (nearly 20% in the source beam), the decomposition diagrams of which are as follows:

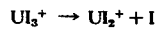

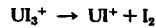

The decomposition yields with respect to the initial ion beam which enters each collision box are 0.7% and 0.3% respectively.

It is consequently necessary to take these parallel decompositions into account in order to establish the voltage $V_2$. In the case under consideration, both experience and a study of the energy peaks of $UI_3^+$, $UI_2^+$ and $UI^+$ lead to the choice of $V_2 = -9720$ volts instead of $-9724$ volts for example (this value corresponds to $(V'_2 + V''_2)/2$ if it is desired to obtain an enrichment of 3% in a single step.

In this example of application, the collision boxes can be cooled to approximately 150° C if necessary in order to cause the condensation of $UI_3$ on the walls.

Other halogenated compounds of uranium are equally well suited to the separation of the uranium-235 isotope by the method according to the invention; among these can be mentioned by way of example the bromides $UBr_4$, $UBr_3I$ and $UBr_2I_2$ and the chlorides $UCl_4$, and $UCl_3Br$ and $UCl_3I$.

In the case of the derivatives $UBr_4$, $UBr_3I$ or $UCl_3I$, the formation of the secondary ion results in the loss of an atom of Br in the first case and in the loss of an iodide atom in the last two cases and the corresponding energy peaks are often interlaced. Under these conditions, optimization must be sought by making a judicious choice of the voltage $V_2$ between two generally contradictory objectives, namely and achievement of a predetermined and relatively high enrichment factor in a single step or the desire to avoid excessive loss of U-235 in compounds having a mass of higher value than that of the compounds which are retained in the boxes.

In the case of the bromide $UBr_4$, the decomposition reaction employed corresponds to the diagram:

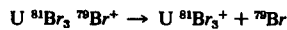

in the case of the isotope 238 of U, $x_1 = (m_1/M_1) = 481/560 = 0.8589$
in the case of the isotope 235 of U, $x_2 = (m_2/M_2) = 478/457 = 0.8581$ If $V_1 = 2000$ V is adopted, we obtain
$V'_2 = -x_1 V_1 / 1 - x_1 = -12\ 094$ volts
$V''_2 = -x_2 V_1 / 1 - x_2 = -12\ 174$ volts By choosing $V_2 = -12\ 120$ volts, a study of the energy peaks shows that there is a 10% enrichment in $^{235}U$. Since the probability of existence of the compound $U\ ^{81}Br_3\ ^{79}Br$ is 3/16th in the isotopic mixture $UBr_4$, the real enrichment will in fact be only $3/16 \times 10\% = 1.875\%$. If it is desired as a final objective to obtain a real enrichment of 3%, two successive operations are therefore required in order to achieve this result.

In each particular case, the choice of the use of either one, two or a number of operations is governed only by the objective to be gained.

What we claim is:

1. A method for separating the isotopes of a chemical element, wherein said method consists in producing a beam of positive or negative primary ions of at least one compound of said element, in accelerating said ion beam in order to pass said beam through a predetermined number of collision boxes which are open at both ends and placed one after another in series, in successively initiating within each collision box, by inelastic collisions of said ions with the molecules of a neutral target gas with which said boxes are filled at low pressure, the dissociation of a given percentage of the primary ions into at least two fragments such that one fragment is a secondary ion which appears in the form of at least two different isotopic species with respect to the elemtent to be separated, and in choosing the potential $V_2$ to which said collision boxes are brought in order to trap preferentially therein one of the isotopic species aforesaid which is caused to condense within each collision box.

2. Process for separation of isotopes as described in claim 1, including the step of collecting secondary ions of each isotopic variety between two consecutive boxes, and condensing each variety separately.

3. A method according to claim 1 for separating the isotopes of a chemical element, wherein the voltage $V_2$ is chosen on the basis of information previously recorded experimentally in regard to the location and area of the different energy peaks corresponding to each of the secondary ions formed in the boxes while taking into account the fact that the chemical nature and the proportion of secondary ions trapped within each box are defined by the presence and the area of said peaks or portions of peaks located within the range of voltages which are lower at absolute value than the value chosen for said voltage $V_2$.

4. A method according to claim 1 for separating the isotopes of a chemical element, wherein all the collision boxes forming part of any one assembly are brought to the same potential $V_2$.

5. A method according to claim 1 for separating the isotopes of a chemical element, wherein at least a number of boxes of any one assembly are brought to slightly different potentials in order to collect mixture having isotopic compositions which are also different.

6. A method according to claim 1 for separating the isotopes of a chemical element, wherein the primary incident ions of charge $e$ end of mass $M$ pass into each collision box with the energy $eV_1$ an there is retained in each box at least part of the formed secondary ions of mass $m$ and of charge $e$ by bringing each collision box to a potential $V_2$ of opposite sign to that of the charge $e$ and of absolute value at least equal to $mV_1/(M-m)$ subject to deviations arising from the distribution of the ion dissociation energies about said value.

7. A method according to claim 1 for separating the isotopes of a chemical element, wherein the primary incident ions of charge $e$ and of mass $M$ enter each collision box with the energy $eV_1$ and produce by dissociation a secondary ion of charge $e$ which exists in two isotopic species having respective masses $m_1$ and $m_2$ ($m_1 < m_2$) and at least part of the ions of mass $m_1$ is trapped preferentially within each collision box by bringing each box to a potential $V_2$ of opposite sign to that of the charge $e$ and of absolute value comprised between $$\frac{m_1 V_1}{M_1 - m_1} \text{ and } \frac{m_2 V_1}{M_2 - m_2} \left( \frac{m_1 V_1}{M_1 - m_1} < \frac{m_2 V_1}{M_2 - m_2} \right)$$

subject to deviations arising from the distribution of the ion dissociation energies about these two values.

8. A method according to claim 1 wherein the untrapped secondary ions are eliminated from the beam between two consecutive boxes by means of a weak electrostatic field which produces practically no action on the primary ion beam.

9. A method according to claim 1 wherein the collision boxes are cooled so as to ensure trapping of the ions retained by condensation on the walls.

10. A method according to claim 1 wherein the collision boxes are filled with a target gas under a pressure of the order of $10^{-3}$ torr.

11. A method according to claim 10, wherein the target gas is a rare gas selected from the group comprising argon and helium.

12. A method according to claim 1 for separating the uranium isotopes 238 and 235, wherein a beam of uranium iodide ions $UI_4^+$ is caused to pass through a predetermined number of collision boxes filled with argon under low pressure by employing the decomposition reaction $UI_4^+ \rightarrow UI_3^+ + I$ and by choosing the potential $V_2$ of each collision box aforesaid such that at least part of the $^{235}UI_3^+$ ions thus produced does not have a sufficient kinetic energy to leave the box in which they are formed.

13. A method according to claim 1 for separating the uranium isotopes 238 and 235, wherein a beam of uranium iodide ions $UI_4^+$ is caused to pass through a predetermined number of collision boxes filled with argon under low pressure by employing the decomposition reaction $UI_4^+ \rightarrow UI_3^+ + I$ and wherein the degree of enrichment in $^{235}U$ of the ions trapped in each box is adjusted by adopting for $V_2$ a value comprised between the energy peaks corresponding respectively to the trapping of $^{235}UI_3^+$ and of $^{238}UI_3^+$.

14. A method according to claim 1 for separating the uranium isotopes 238 and 235, wherein halogenated compounds of uranium are employed as primary ions and selected from the group comprising the bromides $UBr_4$, $UBr_3I$, $UBr_2I_2$ and the chlorides $UCl_4$ and $UCl_3Br$.

15. A method according to claim 14 for separating the uranium isotopes 238 and 235, wherein use is made of the decomposition reaction $^{235}U\ ^{81}Br_3\ ^{79}Br^+ \rightarrow\ ^{235}U\ ^{81}Br_3^+\ ^{79}Br$.

* * * * *